(12) United States Patent
Nagarkar et al.

(10) Patent No.: US 7,696,482 B1
(45) Date of Patent: Apr. 13, 2010

(54) HIGH SPATIAL RESOLUTION RADIATION DETECTOR

(75) Inventors: Vivek Nagarkar, Weston, MA (US); Valeriy Gaysinskiy, Allston, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 299 days.

(21) Appl. No.: 11/445,704

(22) Filed: Jun. 2, 2006

(51) Int. Cl.
*G01T 1/24* (2006.01)
(52) U.S. Cl. .................................. 250/368; 250/370.11
(58) Field of Classification Search .................. 250/368, 250/367, 370.11
See application file for complete search history.

(56) References Cited

U.S. PATENT DOCUMENTS

| | | | | |
|---|---|---|---|---|
| 5,153,438 | A * | 10/1992 | Kingsley et al. | 250/370.09 |
| 5,171,996 | A | 12/1992 | Perez-Mendez | |
| 6,429,437 | B1 * | 8/2002 | Laugier | 250/370.11 |
| 6,469,305 | B2 | 10/2002 | Takabayashi et al. | |
| 6,541,774 | B1 * | 4/2003 | DeJule et al. | 250/370.11 |
| 6,717,150 | B2 * | 4/2004 | Hoffman | 250/370.11 |
| 6,740,897 | B2 * | 5/2004 | Hosoi | 250/584 |
| 6,867,418 | B2 * | 3/2005 | Suzuki et al. | 250/368 |
| 6,921,909 | B2 | 7/2005 | Nagarkar et al. | |

FOREIGN PATENT DOCUMENTS

JP 2001188086 A * 7/2001

OTHER PUBLICATIONS

Nagarkar et al., "CCD-Based High Resolution Digital Radiography System for Non Destructive Evaluation," *IEEE Trans. Nucl. Sci.* 44:885-889 (1997).
Nagarkar et al., "Structured CsI(T1) Scintillators for X-Ray Imaging Applications," *IEEE Trans. Nucl. Sci.* 45:492-496 (1998).
Nagarkar et al., "New Design of a Structured CsI (T1) Screen for Digital Mammography," *SPIE, Physics of Medical Imaging* 5030:541-546 (2003).
Shestakova et al., "A New Sensor for Thermal Neutro Imaging," *IEEE Trans. Nucl. Sci.* 52:1109-1113 (2005).
Shosha and Kaufman, "Method for Evaluation of Diagnostic Imaging Instrumentation," *Phys. Med. Biol.* 26:101-112 (1981).

* cited by examiner

*Primary Examiner*—Constantine Hannaher
(74) *Attorney, Agent, or Firm*—Townsend and Townsend and Crew LLP

(57) ABSTRACT

High spatial resolution radiation detectors, assemblies and methods including methods of making the radiation detectors and using the detectors in performing radiation detection. A radiation detector of the invention includes a substrate, a scintillator layer comprising a microcolumnar scintillator, and an optically transparent outer cover layer, the scintillator layer disposed between the substrate and the cover layer with a gap disposed between at least a portion of the cover layer and the scintillator layer.

22 Claims, 4 Drawing Sheets

HIGH SPATIAL RESOLUTION RADIATION DETECTOR

BACKGROUND OF THE INVENTION

The present invention relates generally to radiation detectors and methods. More specifically, the present invention relates to high spatial resolution radiation detectors, assemblies and methods including methods of making the radiation detectors and using the detectors in performing radiation detection.

Scintillation spectrometers are widely used in detection and spectroscopy of energetic photons and/or particles (e.g., X-rays and gamma-rays). Such detectors are commonly used, for example, in nuclear and particle physics research, medical imaging, diffraction, non destructive testing, nuclear treaty verification and safeguards, nuclear non-proliferation monitoring, and geological exploration.

A wide variety of scintillators are now available and new scintillator compositions are being developed. Among currently available scintillators, thallium-doped alkali halide scintillators have proven useful and practical in a variety of applications. One example includes thallium doped cesium iodide (CsI(Tl)), which is a highly desired material for a wide variety of medical and industrial applications due to its excellent detection properties, low cost, and easy availability. Having a high conversion efficiency, a rapid initial decay, an emission in the visible range, and cubic structure that allows fabrication into microcolumnar films (see, e.g., U.S. Pat. No. 5,171,996), CsI(Tl) has found use in radiological imaging applications. Furthermore, its high density, high atomic number, and transparency to its own light make CsI(Tl) a material of choice for X-ray and gamma-ray spectroscopy, homeland security applications, and nuclear medicine applications such as intra-operative surgical probes and Single Photon Emission Computed Tomography or SPECT.

Scintillation spectrometry generally comprises a multi-step scheme. Specifically, scintillators work by converting energetic particles such as X-rays, gamma-rays, and the like, into a more easily detectable signal (e.g., visible light). Incident energetic photons are stopped by the scintillator material of the device and, as a result, the scintillator produces light photons mostly in the visible light range that can be detected, e.g., by a suitably placed photodetector. Various possible scintillator detector configurations are known. In general, scintillator based detectors typically include a scintillator material optically coupled to a photodetector. In many instances, scintillator material is incorporated into a radiation detection device by first depositing the scintillator material on a suitable substrate. A suitable substrate can include a photodetector or a portion thereof, or a separate scintillator panel is fabricated by depositing scintillator on a passive substrate, which is then incorporated into a detection device.

Improving performance of scintillator detectors is generally of great interest, for example, in order to make scintillation based detectors more useful and capable of filling existing and emerging technical needs. In imaging applications, for example, spatial resolution, or the minimum distance between distinguishable objects in an image, is one of the most important parameters. Recent advances in scintillator compositions and detector configurations, for example, have allowed improved spatial resolution, but further improvements are needed.

Thus, there is a need for improved techniques and methods, as well as devices and assemblies, for increasing performance parameters such as spatial resolution in scintillation based radiation detectors.

BRIEF SUMMARY OF THE INVENTION

Compared to other structures of scintillator material (e.g., powder, glass, etc.), the microcolumnar structure of the scintillator material (e.g., microcolumnar CsI(Tl)) allows improved spatial resolution in radiation detection. However, as described herein, certain factors and configurations of radiation detectors, particularly detectors having microcolumnar scintillator materials, can considerably lower the efficiency of light emission and/or cause lateral emission or scattering of photons.

Furthermore, scintillator material in radiation detectors is often covered with an outer layer, typically for the protective purposes. For example, many known scintillator materials, such as CsI(Tl), are hygroscopic and are susceptible to moisture damage. Therefore, the scintillator material is typically covered with a protective layer or moisture barrier that may include, for example, a layer of organic resin. Unfortunately, certain commonly used conformal and/or protective coatings can cause further degradation in image quality, e.g., because they have a "frosted" surface which further scatters outgoing light photons.

The present invention relates to techniques and devices for increasing light emission efficiency and spatial resolution in scintillation based radiation detectors. For example, in one embodiment, improved efficiency and spatial resolution can be accomplished by replacing commonly used conformal coatings, such as a protective resin coating, with a smooth, flat surfaced outer cover layer.

Thus, in one aspect of the present invention, a high spatial resolution radiation detector is provided. The radiation detector includes a substrate, a scintillator layer comprising a microcolumnar scintillator, and an optically transparent outer cover layer, the scintillator layer disposed between the substrate and the cover layer with a gap disposed between at least a portion of the cover layer and the scintillator layer.

In another aspect, a method of making a high spatial resolution radiation detector is provided. The method includes depositing on a substrate a scintillator layer comprising a microcolumnar scintillator, and positioning an optically transparent outer cover layer over the scintillator layer as to form a gap between at least a portion of the cover layer and the scintillator layer.

In another aspect of the present invention, a method of making a high spatial resolution radiation detector includes depositing on a substrate a scintillator layer comprising a microcolumnar scintillator, and positioning an optically transparent outer cover layer over the scintillator layer.

In yet another aspect of the present invention, a method of performing radiation detection is provided. The method includes providing a high spatial resolution radiation detector, the detector including a scintillator layer comprising a microcolumnar scintillator, and an optically transparent outer cover layer, the scintillator layer disposed between the substrate and the cover layer with a gap disposed between at least a portion of the cover layer and the scintillator layer. The method further includes positioning a target within a field of view of the scintillator as to detect emissions from the target.

Emissions detected according to the invention methods can include, for example, gamma-rays, X-rays, electrons, and the like. Targets for detection can include any source of detectable signal or an absorber between a source and a detector. A target can include, e.g., any potential source of detectable emission, gamma-ray sources (e.g., uranium and the like, X-ray sources, etc.) or an object, biologic object, printed circuit board, etc.

For a fuller understanding of the nature and advantages of the present invention, reference should be made to the ensuing detailed description and accompanying drawings. Other aspects, objects and advantages of the invention will be apparent from the drawings and detailed description that follows.

DETAILED DESCRIPTION OF THE INVENTION

In radiation detection in general, and imaging applications in particular, spatial resolution is an important parameter (see, e.g., Shosa and Kaufman. *Methodology For Evaluation of Diagnostic Imaging Instrumentation*. Phys. Med. Biol. 26:101, 1981). Microcolumnar and pixellated microcolumnar scintillator materials (e.g., CsI(Tl)), for example, have resulted in improved spatial resolution. Compared to other structures of scintillator material (e.g., powder, glass, etc.), the microcolumnar structure of the scintillator material permits improved spatial resolution in radiation detection and imaging applications. For example, the microcolumnar structure allows more efficient channeling along the columns, of the light photons produced from a scintillation event, which are emitted isotropically from the interaction point rather than allowing them to spread laterally through the scintillator material. Each microcolumn basically acts as a light guide.

Ideally, each photon generated in by a scintillation event will escape the top of a scintillator microcolumn with each photon having an escape path parallel to the long axis of the microcolumn. The escaped photon can then be detected, for example, by a suitably placed photodetector. With the microcolumnar configuration, radiation events can be detected with greater sensitivity and the location of the radiation event on the scintillator material resolved with high efficiency. However, certain factors can lower the efficiency of light emission as well as cause lateral emission or scattering of photons.

Figure 1:
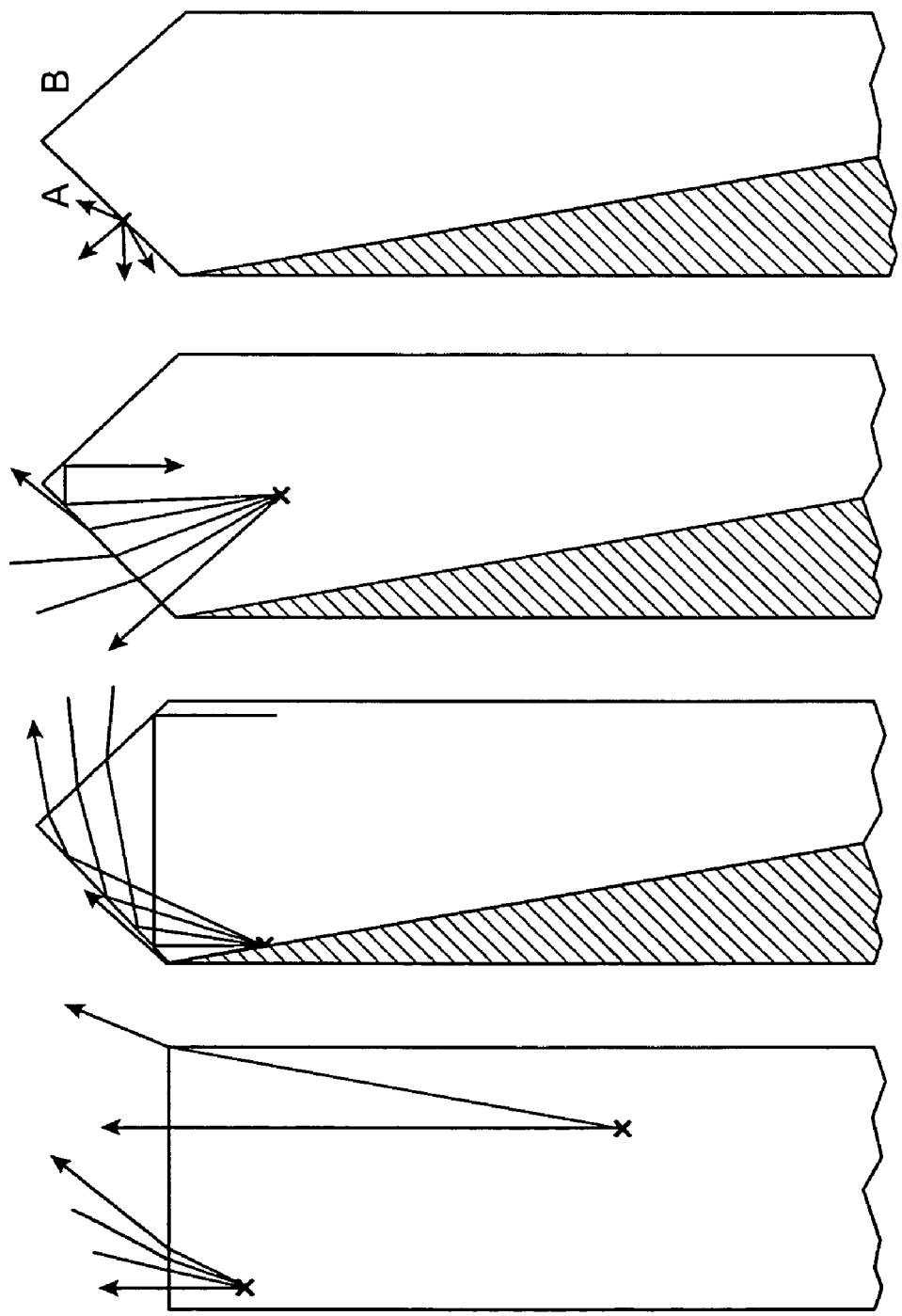
FIG. 1 illustrate various scintillator microcolumns and as well as scintillation photon paths.

One factor that can effect light emission efficiency and spatial resolution includes the shape and/or contours of the microcolumn faces or tops, which can often vary and include irregular shapes. FIG. 1 illustrates microcolumns, including those having "flat-topped" faces or faces perpendicular to the long axis of the column, as well as microcolumns having faceted or pointed tops as generally found in microcolumnar scintillator materials. Flat-topped microcolumns generally provide more efficient and faithful photon emission compared to other microcolumns.

Compared to a flat-topped microcolumn, a faceted/pointed top microcolumn reflects more photons back into the microcolumn, see, e.g., FIG. 1. Thus, photons are more likely to escape through the top of a flat-topped microcolumn as compared to photons in a faceted/pointed microcolumn. Furthermore, most photons escaping a flat-topped microcolumn will be within a solid angle dictated by the critical angle for the two materials involved (e.g., scintillator and adjacent material such as air, resin, etc.), thus yielding acceptable light emission and resolution parameters. That solid angle, however, is much greater for a faceted/pointed microcolumn top compared to a flat-topped microcolumn, resulting in a greater angular or lateral spread of emitted light and consequently reduced spatial resolution. Snell's law and the concepts of critical angle and total internal reflection describe this effect.

Thus, each reflection of a photon at a faceted or pointed top of a microcolumn presents a photon with particular opportunities (see, e.g., FIG. 1). Preferably, the photon escapes out the microcolumn top in a direction generally parallel to the longitudinal axis of the microcolumn thereby allowing detection, for example, by a suitably placed photodetector.

The photon may escape when initially incident on the microcolumn top or may be reflected internally one or more times before escaping out the top. For example, the photon may escape the top following an initial or first reflection in the microcolumn. The photon may escape at a location on the top other than the location of first reflection (e.g., a side opposite the side of a first reflection or another facet on the top), but at an angle much greater than its original angle relative to the long axis of the microcolumn.

A photon's initial path traveling toward the top of the microcolumn may be relatively parallel to the long axis of the microcolumn, as is ideal for a flat-topped microcolumn. But after the first reflection of the photon from the interior of the top, the photon path is probably within the escape angle of another part of the top, and the photon may leave the top of the microcolumn at an angle up to 90 degrees or more from the outward-facing direction of the long axis of the microcolumn.

In some instances, a photon may not escape out the microcolumn top. Other possibilities may include the following: absorption of the photon internally in the microcolumn (reducing light output); photon escape through the side of the microcolumn (increasing cross-talk between columns or reducing light output by being absorbed by EMA (Extra Mural Absorption) fibers); photon escape through the base of the microcolumn and absorption by the substrate (reducing light output); reflection from the base of the microcolumn and up into an adjacent microcolumn (increasing cross-talk); reflection back from the base of the microcolumn or from the substrate (gaining an additional chance to exit the top); reflection one or more times internally within the microcolumn, until one of these other possibilities occurs.

Where the top of a microcolumn is sufficiently pointed or highly acute, minimal photons will escape the microcolumn on a path parallel to the long axis of the microcolumn. And many of the photons that do escape will instead disperse laterally.

The location of the scintillation event within the microcolumn can also effect light emission and spatial resolution. A photon generated by a scintillation event occurring relatively near the top of a faceted/pointed microcolumn (e.g., within or near the top volume) will escape the microcolumn about as easily as when the microcolumn top is flat, although its solid angle will be greater compared to that in a flat-topped microcolumn. As the depth of the scintillation event increases, however, the likelihood of the photon interacting with the exit interface of the scintillator material (e.g., interface of scintillator material and adjacent material) at an angle greater than the critical angle also increases. Such an increase of the angle increases the photon's chances of reflection, thereby increasing the photon's chance of a less desirable escape direction (e.g., lateral escape direction) or decreasing the photon's chance of escape out the top of the microcolumn.

As set forth above, scintillator material of a radiation detector is often covered with an additional layer, such as a protective layer or moisture barrier that may include, for example, a conformal layer having an organic resin. However, such coatings or resins can further contribute to light loss and resolution-reducing light spread or scattering (e.g., lateral light scattering). For example, conformal coatings such as para-xylylene polymer compositions (e.g., compositions known by the trade name "parylene", such as available from Paratronix, Inc., Attleboro, Mass.) often allow photons which enter the coating to be reflected internally, which contributes to light loss and decreased efficiency of the detector. Furthermore, the net escape angle for a photon passing through two flat, parallel interfaces (e.g., scintillator-coating, then coating-air) is about the same as for one interface (e.g., scintillator-air, where the index of refraction of air is about 1), but the final photon path where multiple interfaces are involved is displaced compared to the final path for one interface. Thus, while the photon paths are parallel, the displacement of the final path for multiple surface results in further angular dispersion of the light. Additionally, conformal coatings typically include an irregular (e.g., matte, frosted, etc.) surface that further reflects or causes photons to either escape unpredictably or scatter laterally, further reducing resolution and detector efficiency.

Figure 2:
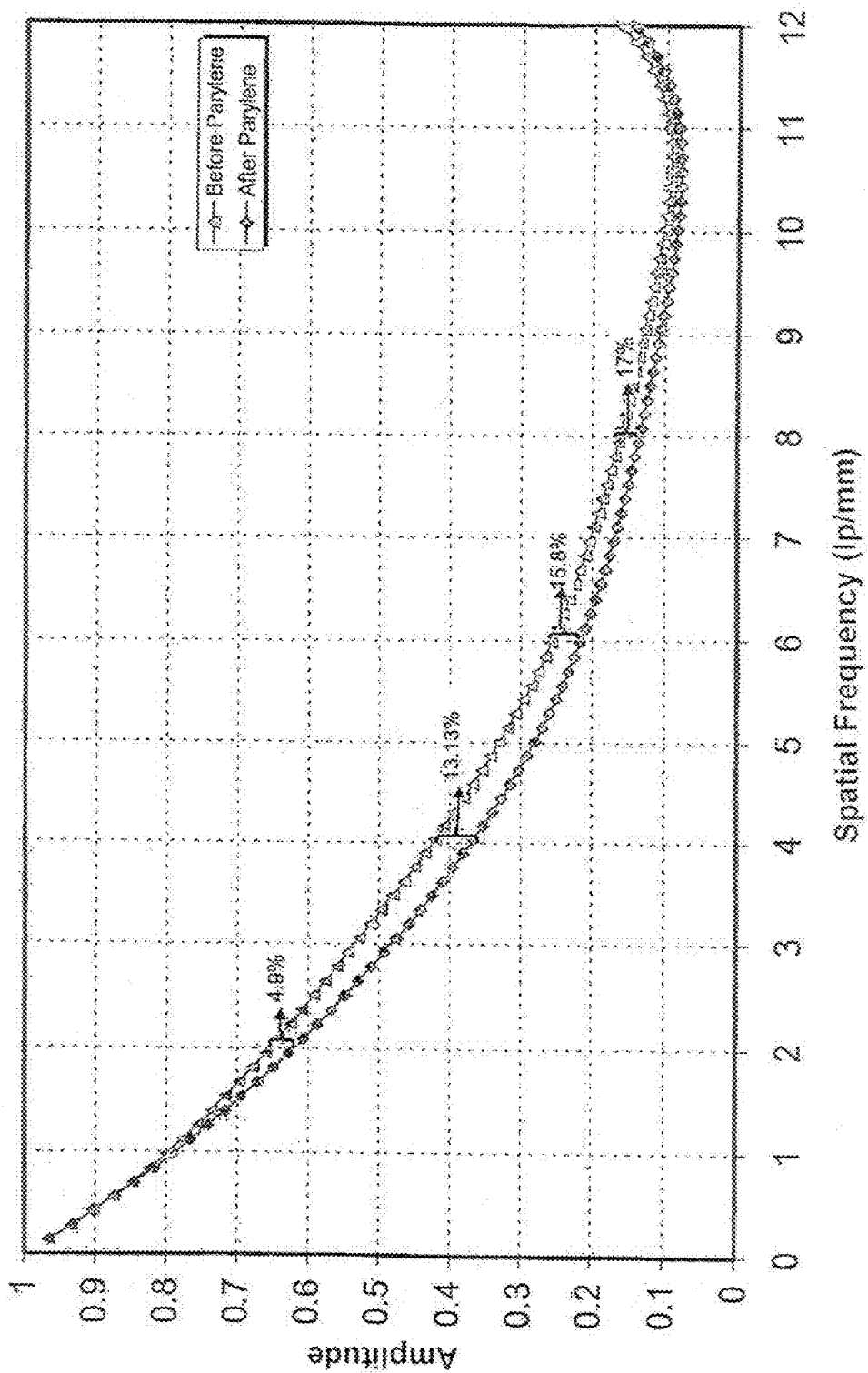
FIG. 2 show modulation transfer function (MTF) measurements for uncoated CsI(Tl) scintillator and CsI(Tl) scintillator coated with Parylene™.

By way of illustration, the example of CsI (Tl) scintillator directly coated with Parylene™ is described. The Parylene™ coating has an index of refraction of about 1.65 while CsI(Tl) scintillator has an index of refraction of about 1.80. The net escape angle for a photon passing through two flat, parallel interfaces (scintillator-Parylene™, then Parylene™-air) is the same as the escape angle for one interface (scintillator-air directly, where the index of refraction of air is about 1). That is, the paths of the photons are parallel, except that the final path for multiple interfaces is displaced from the final path for one interface. Since the outer surface of Parylene™ is not flat, further angular or lateral dispersion of the light occurs. FIG. 2 shows the modulation transfer function (MTF) for the microcolumnar CsI(Tl) scintillator coated with Parylene™ and bare or uncoated microcolumnar CsI(Tl) scintillator. As illustrated, MTF is improved in bare or uncoated scintillator compared to a Parylene™ coated scintillator.

Another factor that can effect light emission efficiency and spatial resolution includes the distance between the scintillator layer a coating or outer layer. In the case of flat-topped microcolumns, for example, placing a cover layer such as glass directly atop the scintillator layer should have minimal effect on resolution. For faceted/pointed-top microcolumns, however, placing an outer cover layer directly atop the microcolumns can degrade resolution. For example, for a cover layer directly atop a faceted microcolumn, the resolution degrades increasingly as the angle of the light entering the cover layer increases from the normal to the cover layer by displacing the path of the light that passes through the glass by up to a distance equal to the thickness of the outer cover layer. The displacement will depend on the angle of the photon path relative to the normal of the cover layer. Most of the "high-angle" light will be spread widely across the image area, contributing mostly to uniform background noise.

As such, increasing light emission efficiency and spatial resolution can be accomplished by addressing at least the various factors set forth above. For example, in one embodiment, improved efficiency and spatial resolution can be accomplished by replacing a conformal coating, such as a protective Parylene™ coating, with a smooth, flat surfaced outer cover layer of minimum thickness consistent with the robustness requirements for the device.

Figure 3:
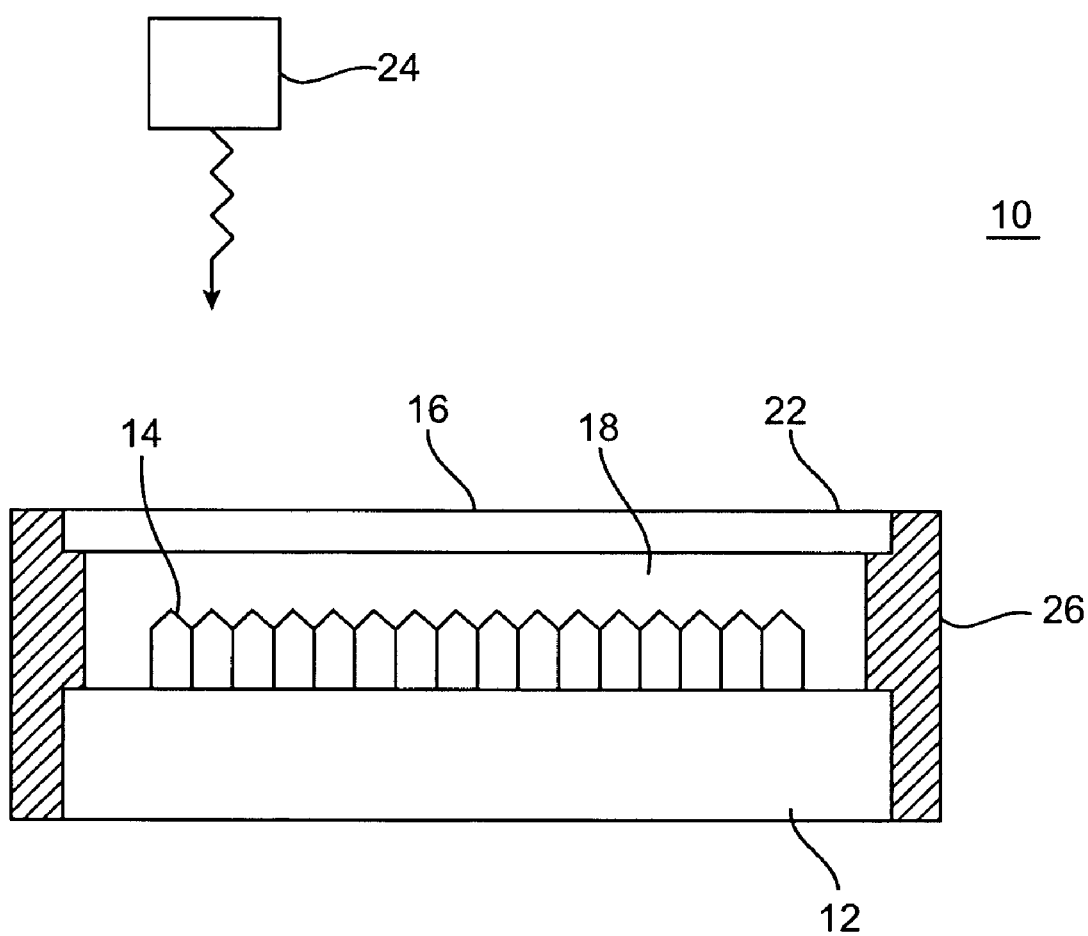
FIG. 3 illustrates a high resolution radiation detector according to an embodiment of the present invention.

Referring to FIG. 3, a high resolution radiation 10 according to an embodiment of the present invention is described. The radiation detector 10 includes a substrate 12 and a scintillator layer 14. The radiation detector 10 further includes an outer cover layer 16. The scintillator layer 14 is disposed between the substrate 12 and the outer cover layer 16, and the outer cover layer 16 is positioned in the detector 10 so that it is spaced from the scintillator layer 14 as to form a gap 18 between the cover layer 16 and scintillator layer 14. The cover layer 16 includes opposing first 20 and second 22 sides, at least one of which can typically be smoothed and/or flat, or substantially planar. Optionally, at least one side can comprise an antireflective coating. In the illustrated embodiment, the outer cover 16 layer is spaced from the entire scintillator layer 14 so the gap 18 is disposed in the entire space separating the cover layer 16 and scintillator layer 14. The outer cover layer 16 can be held in place by a frame 26 or other positioning member. Thus, the cover layer 16 is not in contact with the scintillator layer 14 at any point. In use, a target 24 can be positioned within a field of view of the detector 10 as to detect emissions or absorption from the target 24. As can be appreciated, the target 24 can have various locations/orientations with respect to the detector 10, e.g., the target 24 can be on the substrate side of the detector 10, etc.

Figure 4:
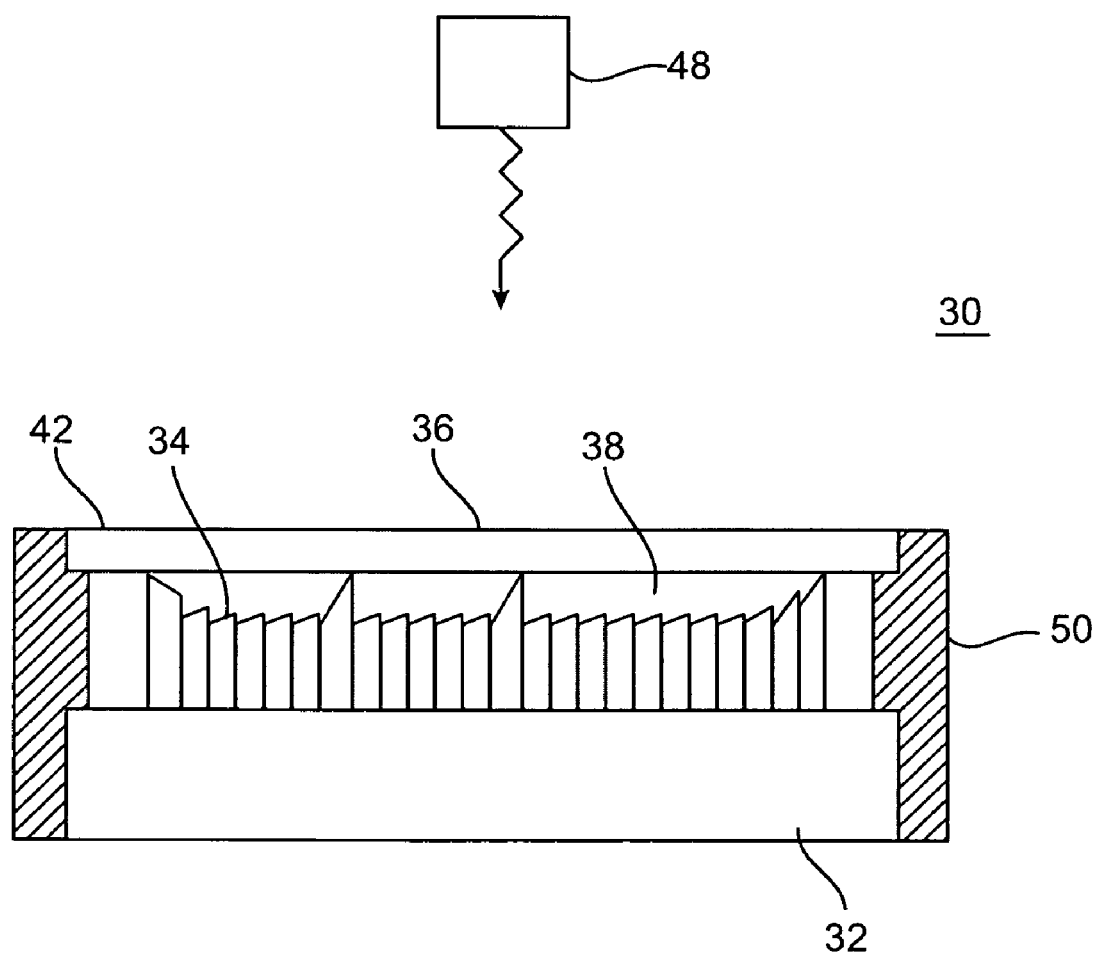
FIG. 4 illustrates a high resolution radiation detector according to another embodiment of the present invention.

FIG. 4 depicts another embodiment of a high resolution radiation detector according to the present invention where an outer cover layer is spaced from less than the entire scintillator layer. The radiation detector 30 includes a substrate 32, a scintillator layer 34, and an outer cover layer 36. The scintillator layer 34 is disposed between the outer cover layer 36 and the substrate 32 and a gap 38 is disposed between the cover layer 36 and the scintillator layer 34. The outer cover layer 36 can optionally be held in place by a frame 50 or other positioning member. The cover layer 36 includes opposing first 40 and second 42 sides at least one of which can be smoothed and/or flat, or substantially planar. As illustrated, the microcolumns of the scintillator layer 34 may be non-uniform in their dimensions, including shape of the microcolumn tops or height of the microcolumns. As such, the cover layer 36 can be positioned adjacent to or in contact with some of the microcolumns while still forming a gap 38 between the cover layer 36 and other microcolumns of the scintillator layer 34. In use of the detector 30, a target 48 can be positioned within a field of view of the detector 30 as to detect emissions or absorption from the target 48. As can be appreciated, the target 48 can have various locations/orientations with respect to the detector 30, e.g., the target 48 can be on the substrate side of the detector 30, etc.

Table I shows the light output and spatial resolution measurements for various detector configurations. Measurements were taken with a lens based system (e.g., Roper camera). Measurements for bare CsI(Tl) scintillator material ("As Deposited"), or scintillator not having an outer cover layer, is shown and serves as a comparison point. Detectors having either a Mylar™ cover layer or a antireflective tri-acetate cellulose ("AR/Tal") cover layer were measured. For each cover layer, measurements were taken for configurations where the cover layer was "off screen" or entirely spaced from the scintillator layer (see, e.g., embodiment illustrated in FIG. 3) or where the cover layer was "on screen" or some, but less than all, microcolumn tops (see, e.g., embodiment illustrated in FIG. 4). As can be seen from Table I, the cover layers did not result in any significant degradation of light output or spatial resolution compared to bare scintillator. Similar results were obtained with a glass outer cover layer having an anti-reflective coating (obtained from Edmund Optics, Inc. Cat. #U46-103) (data not shown).

TABLE I

| Condition | Light Output (ADU/mR) | Resolution (lp/mm) |
| --- | --- | --- |
| As Deposited | 13.3 | 4.3 |
| 6 micron Mylar™ Cover (1 cm off screen) | 12.8 | 4.0-4.3 |
| 6 micron Mylar™ Cover (on screen) | 13.6 | 4.0-4.3 |
| AR/Tal (off screen) | 13.3 | 4.3 |
| AR/Tal (on screen) | 13.9 | 4.3 |

As set forth above, a high resolution detector of the present invention includes a substrate, with a variety of substrates being suitable for use in an invention detector. Substrates can vary in material characteristics such as shape, surface texture and/or finish, purity, composition, density, construction (e.g., solid, corrugated, frothed, etc.), hardness, etc. Moreover, the various substrates may vary with regard to energy (e.g., X-rays, gamma-rays, etc.) and/or light transmission properties including, for example, transparency or translucency to light photons. Typically, the substrate will not be optically transparent to light photons produced in the scintillation process. Non limiting examples of substrate compositions include amorphous carbon, glassy carbon, graphite, aluminum, sapphire, beryllium, boron carbide or boron nitrate. The substrate can comprise a portion of an assembled detector device or assembly and/or comprise a detector portion (e.g., scintillator panel) that can be adapted to or incorporated into a detection device or assembly.

The substrate may be optionally processed and/or modified prior to application of additional coatings, such as the scintillator layer. For example, a substrate surface can be processed in order to refine substrate surface conformation, such as to even the substrate surface and remove projections/recesses present on the substrate surface. In some instances, for example, substrate processing may be preformed in order to enhance adhesion of a layer deposited thereon (e.g., scintillator layer, etc.). Non-limiting examples of processing include chemical etching, sandblasting, laser etching, laser patterning, cleaning (e.g., plasma cleaning procedures), and the like.

Scintillator layer can be deposited directly on a surface of the substrate or the detector can include additional layers disposed between the substrate and the scintillator layer. Additional layers can include, for example, an optically absorptive or reflective layer, a protective layer (e.g., polymer protective layer, organic resin, etc.), a resin binding layer, and the like. Optically absorptive or reflective layers can include, for example, inorganic materials, such as metals and the like. A light absorptive layer may be useful, for example, for absorbing light from the scintillator layer which might otherwise affect resolution. A light-reflective layer can be used, e.g., to reflect incident light back into a deposited scintillator layer so that a greater portion of the light exits the scintillator material at a desired alternative location (e.g., microcolumn tops), which can increase the detected signal, thereby improving signal-to-noise ratios.

In another embodiment, an additional of the radiation detector can include a resin layer or coating disposed between the substrate and the scintillator layer. For example, a resin layer can be formed on the substrate and scintillator layer deposited on the resin layer. A resin layer typically includes an organic polymer, for example, such as para-xylylene polymer compositions. Various para-xylylene polymer compositions are known and include, for example, compositions known by the trade name "parlylene" (e.g., such as available from Paratronix, Inc., Attleboro, Mass.). Resin coatings can also include films, tapes, and the like and can comprise materials such as polyesters (e.g., Mylar™), polyimides (e.g., Kapton™), polyvinylidene chlorides (e.g., saran resins or films), and epoxy polymers.

A variety of different scintillator materials may be used in forming a scintillator layer of a radiation detector of the present invention. In a particular embodiment of the present invention, the radiation detector includes a scintillator layer having a CsI(Tl) scintillator, such as a microcolumnar CsI(Tl) scintillator (Nagarkar et al., IEEE Trans. NucL Sci. 44:492 (1998); Nagarkar et al., IEEE Trans. Nucl. Sci. 44:885 (1997)). Furthermore, a microcolumnar layer may be pixellated, for example, so as to further improve spatial resolution. Thus, in one embodiment, the scintillator layer includes a pixellated micro-columnar film scintillator. A scintillator layer can include, for example, a pixellated micro-columnar CsI(Tl) scintillator. For further discussion of pixellated microcolumnar film scintillators see, for example, Nagarkar et al., *SPIE, Physics of Medical Imaging*, Vol. 4, No. 21, pp 541-546, (2003); and Shestakova et al., *IEEE Trans. Nucl. Sci.*, Vol. 52, No. 4., Aug. (2005). See also, commonly owned U.S. Pat. No. 6,921,909, which is incorporated herein by reference.

The thickness of the scintillator layer will depend, in part, on the desired use of the radiation detector. For example, the scintillator layer will have a thickness of about 10 μm to about 10 mm. In one embodiment, a microcolumnar CsI(Tl) scintillator layer will have a thickness of about 3 mm to about 10 mm (e.g., "thick" scintillator). In other embodiments, the scintillator layer is a "thin" scintillator, having a thickness of about 10 μm to about 0.5 mm. As can be appreciated, the terms "thick" and "thin" are relative terms, and the thickness of a "thick" CsI(Tl) scintillator layer will merely be thicker than a given or desired spatial resolution. Because the columnar structure of the CsI(Tl) scintillator layer, the columns channel light mostly along the columns, so that the resolution is determined principally by column diameter, instead of or in addition to the thickness of the layer, and the thickness can therefore be higher without detrimentally affecting the resolution.

The high density and high average atomic number of CsI (Tl), for example, converts incident radiation into light with high efficiency and the microcolumnar structure channels the scintillation light by total internal reflection to the detection device (e.g., CCD). The conversion gain of CsI(Tl) is ±60,000 photons/MeV. Furthermore, the scintillator structure can be made sufficiently thick (e.g., 3 mm to 4 mm) to absorb a significant fraction, e.g., about 70% or more, of incident high energy gamma radiation without sacrificing the spatial resolution, overcoming the traditional tradeoff between these quantities. Thus, a combination of the high stopping power (e.g., 70% or higher) and high light output (e.g., 60,000 photons/MeV), along with the excellent light channeling properties of microcolumnar CsI(Tl) (evident from its spatial resolution measurements) allow detection of energetic photons (e.g., X-rays, gamma-rays, etc.) with high efficiency, high signal-to-noise ratio (SNR), and high spatial resolution.

The microcolumnar CsI(Tl) scintillator converts incident energy signals into visible light with very high efficiency and, by virtue of its structure channels the light, for example, toward an operatively coupled photodetector. Furthermore, with its fast scintillation decay, the CsI(Tl) allows rapid imaging (e.g., X-ray, etc.) without image blurring arising from residual intensity from previous exposures. Thus, the combination of a microcolumnar CsI(Tl) scintillator in a radiation detector of the invention and an optically coupled photodetector can provide very high sensitivity, for example with a range of about 90% to about 95%, high spatial resolution, such as for example, from about 50 to about 70 µm, and a substantially improved signal to noise ratio ("SNR") (e.g., an improvement of about a 10 times) and high spatial resolution.

Scintillators used in the inventive radiation detectors may be suitable for use in a variety of radiation detection applications including, e.g., high-speed imaging applications. In high-speed imaging applications, for example, a premium is placed on the X-ray to light conversion efficiency, the speed of emission or decay time, and the X-ray stopping power of the scintillator. CsI(Tl) has high light conversion efficiency, a fast decay time, good X-ray stopping properties, and is easily fabricated.

As set forth above, a detector of the invention further includes an outer cover layer, which is positioned with respect to the scintillator layer such that a gap is disposed at least in some parts between the scintillator layer and the cover layer. The cover layer will typically be optically transparent. As used herein, the term "optically transparent" with respect to elements of a detector refers to material that is transparent at least at the wavelength of the photons emitted by the scintillator layer. For example, in one embodiment of the invention the cover layer is optically transparent to scintillator (e.g., CsI(Tl)) light with emission at 540 nm. A cover layer can include additional coatings, such as one or more antireflective coatings, including those known in the art.

The cover layer is typically substantially rigid and can include a variety of materials including, for example, a glass or a plastic, such as acrylic. The cover layer can be a portion of a separate device, such as a lens-based coupling configuration (e.g., camera, etc.), photodetector, visualization interface, imaging equipment, and the like, or can be separate, but capable of being incorporated in one or more of the above mentioned devices. Furthermore, the cover layer will have at least one surface that is substantially flat or planar, and/or sufficiently smoothed so as to reduce lateral scattering or deflection of light due to the texture of the cover surface, and will optionally have an antireflective coating. In one embodiment, the cover layer has opposing flat/smoothed surfaces. When the cover layer is incorporated into a detector of the invention, such a flat/smoothed surface will be generally perpendicular to the longitudinal axes of the scintillator microcolumns, and generally parallel with the surface of the scintillator layer from which photon emission is desired.

Any suitable means for positioning the cover layer in the invention detector, such as to maintain a gap between the scintillator layer and the cover layer and maintain the integrity of the detector assembly, can be used. For example, a mechanical means, such as one or more standoffs, can be used to maintain separation (e.g., gap) at the desired distance. A mechanical means can also include a continuous or partly-continuous raised rim on a portion of the detector (e.g., cover layer, scintillator layer, etc.) against which the opposing material rests, or a continuous or partly continuous gasket which matches the periphery shape of the cover layer and/or scintillator layer. Additionally, the detector can include a frame structure (e.g., metal, plastic, etc.) into which detector components can be fixed in a stable position. A resin, adhesive or cement compound can be used, alone or in combination with other positioning means, to seal the edges of the cover layer such that the scintillator layer and cover layer are held in place relative to each other until the compound cures. Various other means for positioning the cover layer in the invention detector can be used.

The length of a gap, or distance between the cover layer and the scintillator, can vary depending on the composition and intended use of the detector, but generally includes a length of about 0.01 mm to about 2 mm. In one embodiment, for example, the range is about 0.01 mm to about 0.5 mm.

The detector gap can be empty (e.g., filled with vacuum or partial vacuum) or can be filled with a dry inert gas (e.g., air, nitrogen, argon, etc.). An evacuated volume may require either supports to avoid collapse of the cover or an application with vacuum on both sides of the cover.

The radiation detectors can be connected to a variety of tools, devices, and assemblies, as mentioned previously, and used in various methods of radiation detection. Non-limiting examples include nuclear weapons monitoring and detection devices, geological exploration devices, such as well-logging tools, and imaging devices, such as nuclear medicine devices (e.g., single photon emission computed tomography (SPECT), X-ray computed tomography (CT), and the like).

It is understood that the examples and embodiments described herein are for illustrative purposes only and that various modifications or changes in light thereof will be suggested to persons skilled in the art and are to be included within the spirit and purview of this application and scope of the appended claims. Numerous different combinations are possible, and such combinations are considered to be part of the present invention.

What is claimed is:

1. A high spatial resolution radiation detector, comprising:
    a substrate;
    a scintillator layer comprising microcolumnar CsI(Tl); and
    a rigid, optically transparent outer cover layer comprising a non-conformal material, the cover layer at least partially forming an optical path to a photodetector, the scintillator layer disposed between the substrate and the cover layer with a gap disposed between at least a portion of the cover layer and the scintillator layer.

2. The detector of claim 1, wherein the substrate is optically non-transparent.

3. The detector of claim 2, wherein the substrate comprises an optically absorptive or reflective material.

4. The detector of claim 2, further comprising a para-xylylene polymer layer disposed between the substrate and the scintillator layer.

5. The detector of claim 1, wherein the outer cover layer comprises substantially flat and smoothed opposing first and second sides.

6. The detector of claim 1 wherein the non-conformal material comprises a plastic.

7. The detector of claim 1, wherein the non-conformal material comprises a glass.

8. The detector of claim 1 the cover layer further comprising an anti-reflective coating.

9. The detector of claim 1, wherein the cover layer is spaced from the entire scintillator layer.

10. The detector of claim 1, wherein the cover layer is in contact with at least one microcolumn of the scintillator layer.

11. The detector of claim 1, wherein the gap comprises a dry, inert gas.

12. The detector of claim 11, wherein the gas is selected from nitrogen or argon.

13. A method of making a high spatial resolution radiation detector, comprising:
    depositing on a substrate a scintillator layer comprising microcolumnar CsI(Tl); and
    positioning a rigid, optically transparent outer cover layer comprising a non-conformal material over the scintillator layer as to form a gap between at least a portion of the cover layer and the scintillator layer, the optically transparent outer cover layer at least partially forming an optical path to a photodetector.

14. The method of claim 13, wherein the substrate is non-transparent.

15. The method of claim 13, wherein the outer cover layer comprises substantially planar/flat opposing first and second sides.

16. The method of claim 13, wherein the non-conformal material comprises a plastic or a glass.

17. The method of claim 16, the cover layer further comprising an anti-reflective coating.

18. The method of claim 13, wherein the cover layer is spaced from the entire scintillator layer.

19. The method of claim 13, wherein the cover layer is in contact with at least one microcolumn of the scintillator layer.

20. The method of claim 13, wherein the comprises a dry, inert gas.

21. The method of claim 13, wherein the gas is selected from nitrogen or argon.

22. A method of performing radiation detection, comprising:
providing a high spatial resolution radiation detector, comprising a substrate, a scintillator layer comprising microcolumnar CsI(Tl), and a rigid, optically transparent outer cover layer comprising a non-conformal material and at least partially forming an optical path to a photodetector, the scintillator layer disposed between the substrate and the cover layer with a gap disposed between at least a portion of the cover layer and the scintillator layer; and
positioning a target within a field of view of the scintillator layer as to detect emissions or absorption from the target.

* * * * *